(12) United States Patent
Nolan

(10) Patent No.: US 9,799,040 B2
(45) Date of Patent: Oct. 24, 2017

(54) METHOD AND APPARATUS FOR COMPUTER ASSISTED INNOVATION

(75) Inventor: Julian Charles Nolan, Pully (CH)

(73) Assignee: Iprova Sarl (CH)

( * ) Notice: Subject to any disclaimer, the term of this patent is extended or adjusted under 35 U.S.C. 154(b) by 514 days.

(21) Appl. No.: 13/431,672

(22) Filed: Mar. 27, 2012

(65) Prior Publication Data

US 2013/0262371 A1    Oct. 3, 2013

(51) Int. Cl.
*G06F 17/30* (2006.01)
*G06Q 30/02* (2012.01)
*G06Q 10/06* (2012.01)
*G06Q 10/10* (2012.01)

(52) U.S. Cl.
CPC ......... *G06Q 30/02* (2013.01); *G06F 17/3061* (2013.01); *G06F 17/30864* (2013.01); *G06Q 10/06* (2013.01); *G06Q 10/10* (2013.01)

(58) Field of Classification Search
CPC ................ G06F 17/3061; G06F 17/30864
USPC ........................................... 707/603
See application file for complete search history.

(56) References Cited

U.S. PATENT DOCUMENTS

| | | | |
|---|---|---|---|
| 5,390,282 A | 2/1995 | Koza et al. | |
| 5,581,663 A | 12/1996 | Zlotin et al. | |
| 6,056,428 A | 5/2000 | Devoino et al. | |
| 6,167,370 A | 12/2000 | Tsourikov et al. | |
| 6,202,043 B1 | 3/2001 | Devoino et al. | |
| 6,360,191 B1 | 3/2002 | Koza et al. | |
| 6,778,994 B2 * | 8/2004 | Gogolak | |
| 7,533,035 B1 | 5/2009 | Abend et al. | |
| 7,685,118 B2 | 3/2010 | Zhang | |
| 2001/0034629 A1 | 10/2001 | Cronin | |
| 2004/0030414 A1 | 2/2004 | Koza et al. | |
| 2004/0078192 A1 | 4/2004 | Poltorak | |
| 2005/0010559 A1 * | 1/2005 | Du | G06F 17/30864 |
| 2006/0036560 A1 | 2/2006 | Fogel | |
| 2006/0047632 A1 | 3/2006 | Zhang | |
| 2007/0112746 A1 | 5/2007 | Todhunter | |
| 2007/0294232 A1 * | 12/2007 | Gibbs | G06F 17/30637 |

(Continued)

FOREIGN PATENT DOCUMENTS

| | | |
|---|---|---|
| WO | WO-2005060684 A2 | 7/2005 |
| WO | WO-2007081519 A2 | 7/2007 |

OTHER PUBLICATIONS

Koza et al., Automated Re-Invention of Six Patented Optical Lens Systems Using Genetic Programming, GECCO, Jun. 25-29, 2005, pp. 1953-1960.

(Continued)

*Primary Examiner* — Boris Gorney
*Assistant Examiner* — Bao Tran
(74) *Attorney, Agent, or Firm* — Blank Rome LLP

(57) ABSTRACT

The present invention relates to a method of computer assisted innovation. The invention provides a method which can automatically generate suggested innovation opportunities which may then be viewed or otherwise communicated to and analysed by a user. The invention provides a method and apparatus for determining innovation opportunities by selecting one or more terms; determining trend data relating to a selected element; determining an innovation likelihood measure for said selected element in dependence upon said trend data; identifying an innovation opportunity in dependence upon said innovation likelihood measure.

16 Claims, 9 Drawing Sheets

(56) References Cited

U.S. PATENT DOCUMENTS

| | | | |
|---|---|---|---|
| 2008/0195604 A1* | 8/2008 | Sears ................................ | 707/5 |
| 2009/0132522 A1* | 5/2009 | Leino ................................ | 707/5 |
| 2012/0191753 A1* | 7/2012 | Gross ................. | G06Q 10/0633 |
| | | | 707/770 |
| 2013/0086032 A1* | 4/2013 | Lundberg .......... | G06F 17/30864 |
| | | | 707/706 |
| 2013/0096909 A1* | 4/2013 | Brun et al. ........................ | 704/9 |
| 2013/0185276 A1* | 7/2013 | Rau ................... | G06F 17/30864 |
| | | | 707/707 |

OTHER PUBLICATIONS

A. L. Porter et al., "Technology Opportunities Analysis," Technological Forcasting and Social Change, vol. 49, No. 3, Jul. 2, 1995, pp. 237-255.
W. Jiwu et al., "Empirical Research on the Technology Opportunities Analysis based on Morphology Analysis and Conjoint Analysis," Portland International Conference on Management of Engineering & Technology, IEEE, Jul. 27-31, 2008, pp. 2041-2047.
H. Abe et al., "Trend Detection from Large Text Data," Systems Man and Cybernetics (SMC), IEEE, Oct. 10, 2010, pp. 310-315.

* cited by examiner

METHOD AND APPARATUS FOR COMPUTER ASSISTED INNOVATION

BACKGROUND a. Field of the Invention

The present invention relates to a method of computer assisted innovation. The invention provides a method which can automatically generate suggested innovation opportunities which may then be viewed or otherwise communicated to and analysed by a user.

b. Related Art

The way in which commercially valuable ideas are generated within organizations has remained largely untouched by the general trend towards improved efficiency through automation. Innovative thinking has traditionally been a very manual process, sometimes stimulated through the application of psychological techniques, such as brainstorming. These techniques bring limited improvement, as they are limited to the pre-existing knowledge of the individuals involved and frequently lack any formal structure.

Another approach to generate innovative ideas is the use of a problem analysis tools and methodologies, some of which are enabled by computer-based technologies that can be applied by a researcher or designer.

Problem analysis tools and methodologies can help a user identify a complex system and identify discrete problems which should be addressed. Here computer systems assist in the application of methods of problem analysis. These include root cause analysis, TRIZ (a Russian acronym for "TeoriyaResheniyaIzobretatelskikhZadatch"), value engineering, system functional analysis, and system benchmarking. TRIZ is a methodology, tool set, knowledge base, and model-based technology for generating innovative ideas and solutions for problem solving. An example of such a tool, called TechOptimizer™, is a computer system marketed by Invention Machine Corporation of Boston, Mass. The technology used in TechOptimizer™ to assist in problem analysis is partially described in U.S. Pat. No. 6,056,428 and U.S. Pat. No. 6,202,043.

A key deficiency with problem analysis tools is that while they aid in the identification of specific issues to be addressed, the user of such tools is required to possess a good knowledge about the problem being considered. In US20070112746, "System and Method for Problem Analysis,", there is disclosed a method for providing user specific relevant information to assist in the modelling of problems, wherein the principle aspect of analysis is cause-effect relationships, and wherein a cause or effect statement is automatically reformulated as a natural language query. The query is submitted to a database, and the results of the query are returned, thereby greatly facilitating the process of identifying related cause-effect data.

An alternative approach is described by U.S. Pat. No. 5,390,282, "A process for problem solving using spontaneously self-replicating and self-improving entities". This invention relates to evolutionary processes useful for problem solving by generating self-replicating and self-improving computer programs.

An approach which is specific to controllers is described by US2004030414, "Method and apparatus for automatic synthesis of controllers". This invention relates to the field of automatic synthesis of complex structures; more particularly, the automatic synthesis of the topology and parameter values for controllers and control systems.

Yet a further approach to automated innovation has been investigated by Hewlett-Packard and others such as Pfizer. This is exemplified by the paper "Automated re-invention of six patented optical lens systems using genetic programming", Proceedings 2005 Conference on Genetic and Evolutionary Computation on pages 1953-1960 which describes how genetic programming was used in an invention machine to automatically synthesize complete designs for six optical lens systems that duplicated the functionality of previously patented lens systems. The automatic synthesis was done "from scratch"—that is, without starting from a pre-existing good design and without pre-specifying the number of lenses, the physical layout of the lenses, the numerical parameters of the lenses, or the non-numerical parameters of the lenses. One of the six genetically evolved lens systems infringed a previously issued patent; three contained many of the essential features of the patents, without infringing; and the others were non-infringing novel designs that duplicated (or improved upon) the performance specifications contained in the patents.

U.S. Pat. No. 6,360,191 describes an automated design process and apparatus for use in designing complex structures, such as circuits, to satisfy prespecified design goals, using genetic operations.

Natural Selection Inc., San Diego, has also used similar technologies based on Darwinian principles of natural evolution and filed patent application US2006036560, "Intelligently interactive profiling system and method".

U.S. Pat. No. 7,685,118 describes a semantic method using an ontology to solve inventor problems. Different possible solutions are ranked based on their generality.

U.S. Pat. No. 6,167,370 describes a piece of software for semantically analysing documents and for creating new concepts and new ideas.

WO2005060684 suggests a semantic approach to Triz. The user needs to express a problem in terms of a natural language query that contains a contradiction and which is submitted to a semantically indexed database.

U.S. Pat. No. 5,581,663 describes another computer-implemented method for solving problems based on the Triz approach. The method starts from a model of the real-world to identify problems and suggest solutions.

US20080195604 describes an automated method for drafting an invention disclosure based on an initial invention concept. The invention involves semantically parsing an initial invention statement, performing an automated prior art search in patent databases to determine patentability issues, and generate an invention disclosure for filing.

US20010034629 describes a method for facilitating the conception of inventions; mainly based on cooperative work among participants, using guidelines etc.

WO07081519 describes another method for generating ideas and selling inventions.

U.S. Pat. No. 7,533,035 describes a method for evaluating innovations based on several factors, and discarding innovations which don't reach a predetermined threshold.

US20040078192 describes a method for automatically performing a semantic analysis of patents and patent claims, and analysing potential infringement.

However, it will be seen that current tools suffer from one or more of the following problems: they need a problem to be defined, require extensive user interaction and training, tend to produce small incremental improvements of low or zero commercial value, are not reactive to the introduction of new technologies and do not work in real-time. As a result users of these systems have to contend with a number of further problems which may include: staff must be trained to use certain methodologies and tools, patenting opportunities may be lost to competitors who identify the innovation opportunity more quickly or the potential invention generated by use of the tools is not novel or has of little or no value.

Moreover, many prior art systems deliver large number of possible solutions to a problem, with no easy way for the user to determine which of those possible solutions is the best one and in particular which solution will give the best patent opportunities.

Moreover, many prior art systems request a lot of human intervention and are not fully automated. When the prior art systems use computers or other processing means, they usually don't use them in an effective way, and request fast processors and/or lot of memory.

An aim of the present invention is thus to develop a new, computer based approach to generate innovation, using computers and semantic methods for detecting as early as possible innovation opportunities which could not be detected without computer.

By taking a new approach to the generation of innovation opportunities, the proposed invention overcomes a number of the problems of the prior art.

In particular, the present invention provides a more automated method of determining innovation opportunities, in which human intervention is reduced.

The present invention also provides a computer-enabled method of determining innovation opportunities, in which a more efficient use of computing resources is made.

The present invention also provides a computer-enabled method of determining innovation opportunities, with which invention opportunities can be identified which might be difficult to identify with a non-computer-enabled method, other than by chance.

The present invention also aims to use computer and software modules for automatically and efficiently detecting innovation opportunities, based on an automatically, continuously performed analysis of trend data for a plurality of terms, and detection of unexpected changes in the frequency of use of some terms or new terms.

SUMMARY OF THE INVENTION

According to the invention there is provided a computer-enabled method of determining innovation opportunities comprising the steps of:
a) causing a data collection module in a processing unit to store expressions retrieved from external data sources in a data collection;
b) causing a data analysis module in a processing unit to identify new expressions among said expressions, based on trend data retrieved for the selected expressions, said trend data comprising use of said expressions in said data source during a period;
c) causing a module in the processing unit to identify an innovation opportunity associated with the identified new expressions; and
d) presenting said innovation opportunity for information and analysis by a user.

The trend data indicates the frequency of use of an expression during a period of time, for example the frequency of use of the expression in source documents, and/or the number of searches for this expression in search engines. An innovation likelihood can be computed form the trend data. An innovation likelihood measure may be a numerical value indicating the probability of an innovation occurring, or may be some other indicator that an innovation may occur. The computation of innovation likelihood from the trend data may be domain specific to reflect the various pace of development in different technologies.

In one aspect of the invention the new expressions are automatically identified, using a computer-enabled retrieval of expressions from various sources and comparison with a set of previously found expressions. New expressions might be for example new words, or new combinations of words, such as new n-grams, for example new bi-grams, which appeared in the data collection during an observation period. New expressions are more likely associated with a high innovation likelihood, based on their associated trend data. For example, an expression which becomes suddenly more popular in the data collection might be associated, during this period, with a high innovation likelihood. An innovation opportunity might then be identified if this new expression is related to the area of interest; a comparison or match with terms used in an ontology defining the area of interest might be used for determining if a new expression is related to the area of interest.

The step of identifying the innovation opportunity thus optionally comprises identifying a match between a new expression and an element in the stored reference data which describes the technical area of interest.

The stored reference data which describes the technical area of interest may be defined with an ontology. It may comprise a reference framework comprising a plurality of interconnected nodes, each node describing an element, such as a term or list of terms.

According to one aspect, the stored reference data is updated in dependence upon feedback from a user relating to said innovation opportunity.

According to one aspect of the invention, the method comprises the steps of: determining trend data relating to a plurality of expressions; determining a respective innovation likelihood measure for each of said plurality of expressions in dependence upon said trend data; and identifying said innovation opportunity in dependence upon a plurality of said innovation likelihood measures.

Preferably an innovation model is used to generate the innovation likelihood measure.

According to another aspect of the invention there is provided an apparatus for determining innovation opportunities comprising: means for identifying one or more new expressions which appear in a data collection; a lifecycle analyser arranged in operation to determine trend data relating to a selected new expression; determine an innovation likelihood measure for said selected new expression in dependence upon said trend data; and identify an innovation opportunity in dependence upon said innovation likelihood measure; and presentation means for presenting said innovation opportunity for information and analysis by a user.

BRIEF DESCRIPTION OF THE DRAWINGS

The invention will now be described, by way of example only, with reference to the drawings, in which.

DETAILED DESCRIPTION

Figure 1:
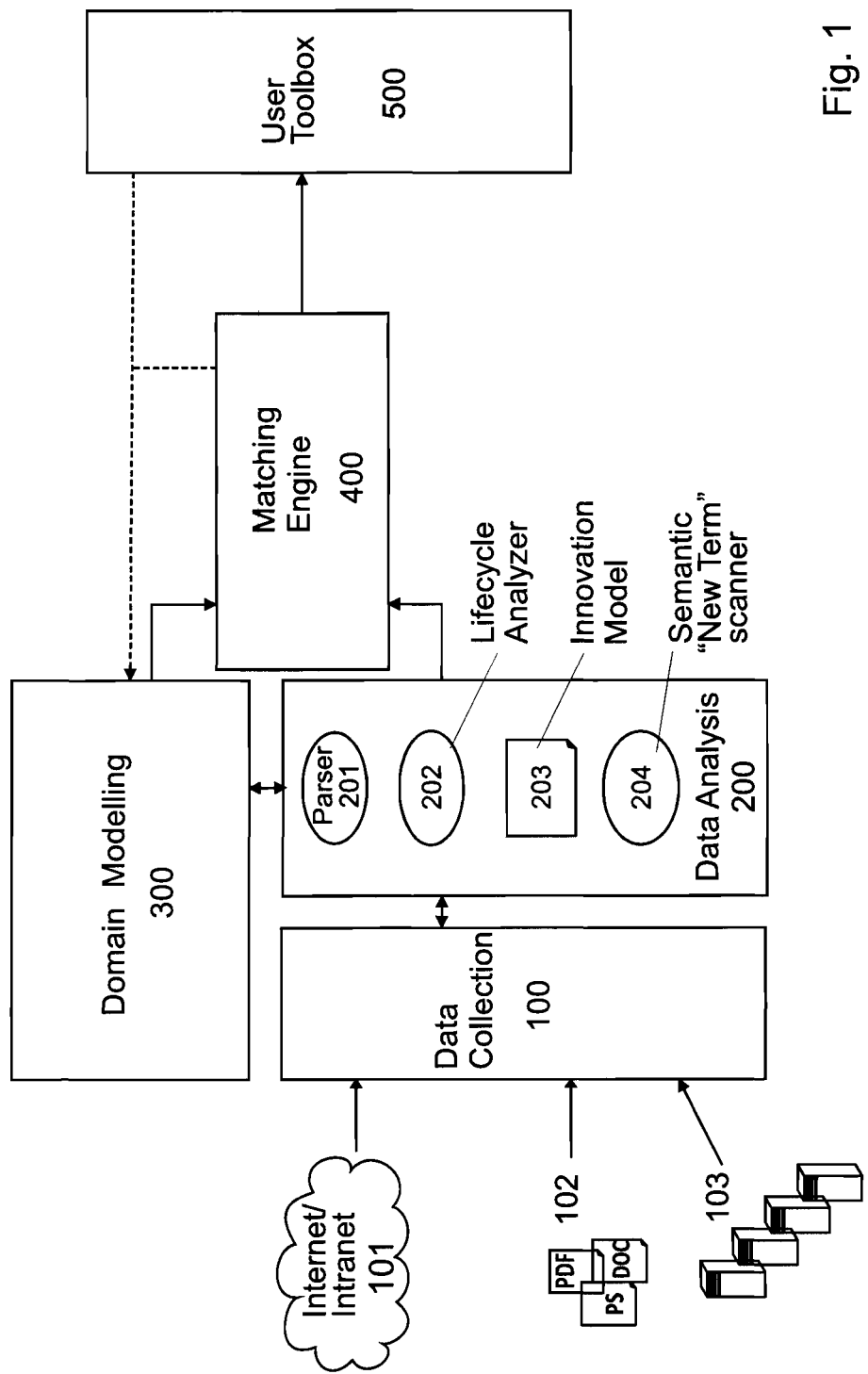
FIG. 1 is an illustration of an apparatus showing components or functional modules according to one aspect of the present invention.

FIG. 1 schematically illustrates some components or functional modules of an apparatus according to one aspect of the present invention. The apparatus comprises a data collection component 100 having a database and data collection module (such as a crawler etc), a data analysis component 200, a domain modelling component 300, a matching engine 400 and a user tool box 500.

The apparatus may be built as a processing unit having software thereon programmed to carry out the method steps described in this specification and bring the requested functionalities. The processing unit may be a computer, a server, or other suitable processing equipment, and computer data carriers, such as an optical, magnetic or semiconductor disk or storage system, for storing software modules or components causing the processing unit to carry out the desired steps of the invention. The apparatus is further connected to external data sources, such as the Internet/Intranet 101, file servers 102, and/or database servers 103, for accessing various data sources and storing the resulting data in a database, which may then be interrogated by a data analysis engine 200 in said processing unit.

Web crawlers may be used to collate "unstructured" data from data sources (e.g. blogs, news sources, real-time social networks, HTML/XML published journals/documents) and Web Searches may be used to collect "structured" data—semantically tagged (optionally, with statistical metadata: time, volume). Crawling frequency may be defined to provide frequent updates, and allow subsequent system function to be provided in real time.

Some data sources 103 provide dedicated feeds which send data out in real-time using a well-defined structure and format (e.g. RSS). Search engine volume data can also optionally be used. Data may also be manually entered and edited by users.

Data sources 101, 102, 103 may be selected either according to their general availability, to the area of interest or with regard to the desired nature of the innovation opportunities to be generated. For example, academic publications may result in innovation opportunities which have a longer time to market, but which also have a greater probability of broader patent claims when compared to industry publications reporting on near term technologies, such as industry journals.

The data retrieved by the data collection module 100 are stored and managed in a database as part of the module 100 and split in expressions, such as words, sentences and/or expressions, for example n-grams (combination of n terms) or bi-grams (combinations of two terms). In this specification and in the claims, the word "expression" (or sometimes "term") is used as a generic for words (such as "LED"), expressions (such as "time-of-flight, etc.), bi-grams (such as "LED backlight"); numbers (such as "12,000"), proper names (such as "Nyquist"), URLs or any other string.

Figure 4:
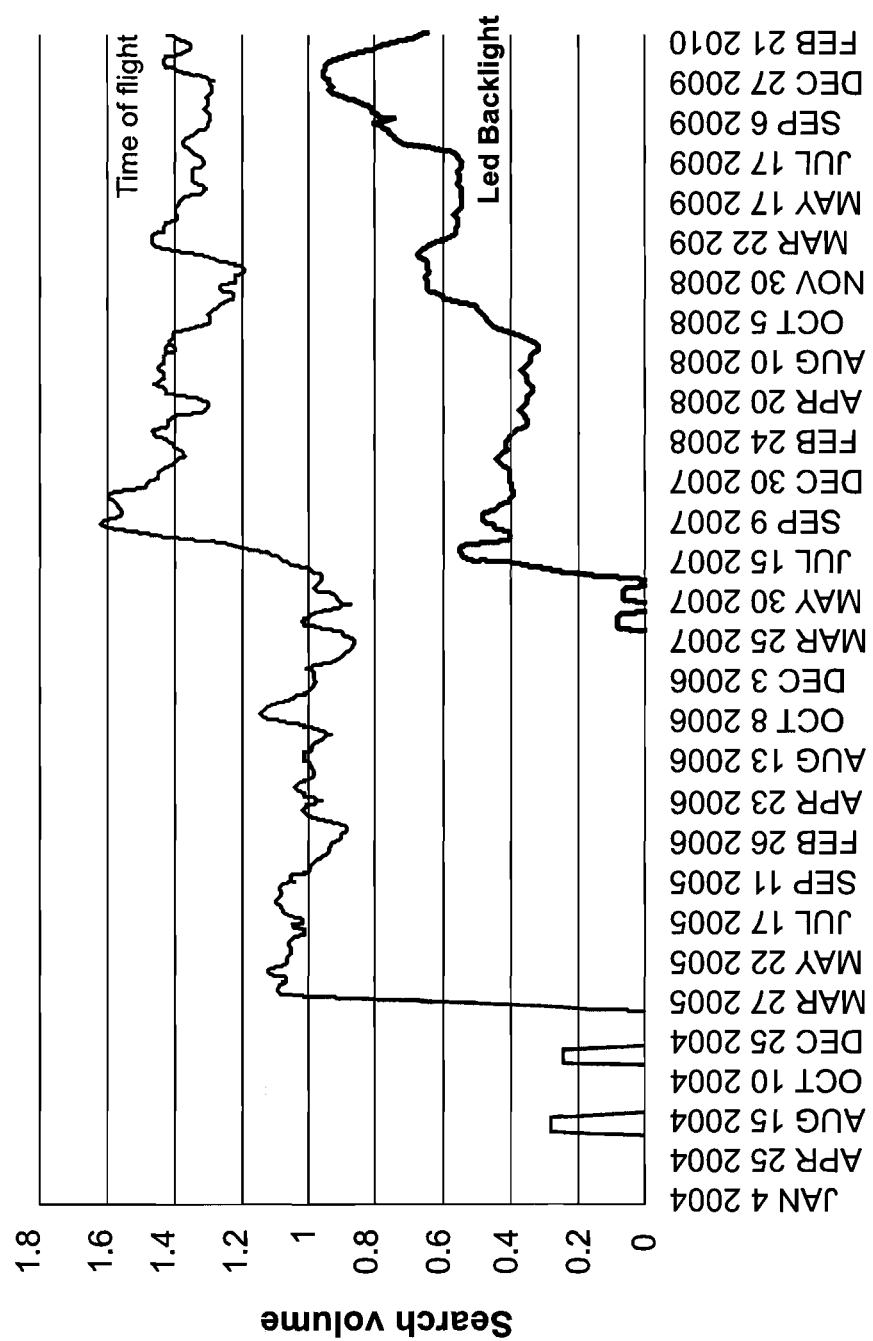
FIG. 4 shows popularity data for some semantic expression shown in FIG. 3.

Content filter can be used to recognise and store url, emails, domain names, person names, non ascii characters and punctuations, upper cases etc.; this special content is ignored, converted, or specially marked. New expressions not previously included in the database are added along with the number of use of the expression, and date of use. The number of use of already existing expressions is updated in the database, and the date of the new use is stored. After each iteration, the database in the data collection component 100 of the apparatus is updated with a new entry such as:

Expression $T_i$, time $t_j$, number of occurrences of $T_i$ at $t_j$,

FIG. 4 is a graph which illustrates as example the daily use of two expressions ("time of flight" and "led backlight") over a period of time. Those trend data for each expression can be directly produced by the lifecycle analyser 202 from the data stored in the database of the data collection component 100.

The apparatus thus stores or uses an index of use of expressions in data sources over a period of time (for example several months). As will be seen, this database will be used to determine an innovation likelihood related with a specific expression, at specific instants when the number of use of an expression suddenly changes.

The expressions retrieved by the data collection component 100 can be ambiguous. For example, a query "time-of-flight" on a search engine can return irrelevant hits related to flight duration together with relevant link related to "electronic devices" which measure the time of flight of a photon (the intended result). Accordingly the data collection component 100 may classify the content of each data source (for example each URL) within classification systems—such as the International Patent Classification, or any suitable patent or document classification scheme—in order to ensure the information is contextually correct. This classification might be automatic or semi-automatic, based on an automatic, semantically driven classifying module. The classification can be used to avoid indexing used of expressions in an irrelevant context (for example use of "time-of-flight" in relation with travelling), and/or to index separately the use of some terms in different contexts. This classification might also be used to limit the identification of innovation opportunities to relevant area of interests, and improve the speed of the method.

The data analysis component 200 comprises a parser 201, a lifecycle analyser 202, at least one innovation model 203 and a semantic new term scanner 204. Those modules are preferably built as software modules carried out by a processing unit. The parser 201 and the semantic new term scanner 204 seek to automatically identify new expressions appeared in the data collections 101, 102 and/or 103 during the period of interest. A new expression is an expression which appeared from the first time during a given time period, or whose use (trend data) as indicated by the lifecycle analyser 202, weighted by the innovation model 203, follows a given pattern during this period.

Figure 3:
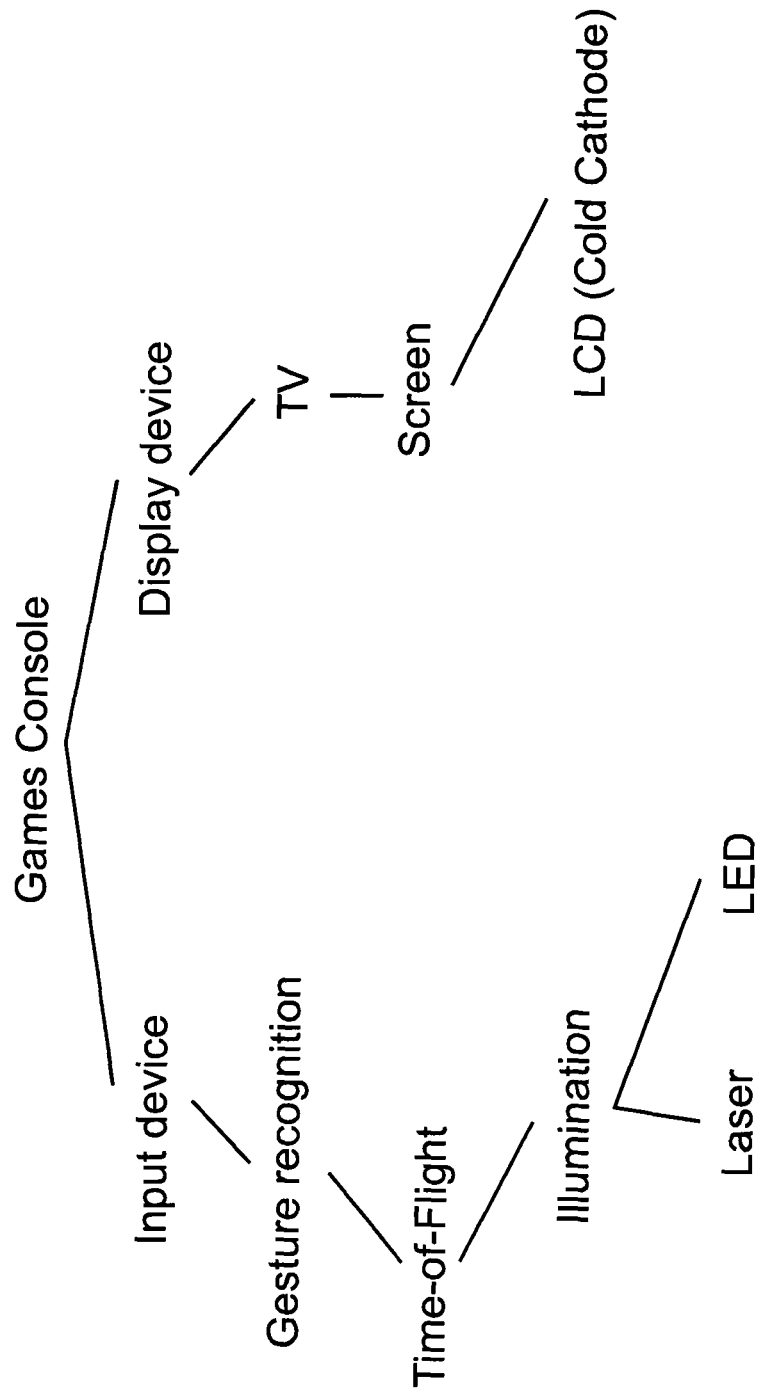
FIG. 3 shows an example reference framework (or ontology)

This determination of new expressions from the data collection component 100 can rely on two complementary strategies. The first of these is pattern-based extraction, whilst the second is based on statistical co-occurrences. The parser 201 and semantic new term scanner components can use a specially defined ontology (see domain modelling component, 300) and a list of expressions stored in the data collection component, 100. An example of ontology related to some aspects of game consoles is illustrated in FIG. 3.

The output of the semantic new term scanner 204 and parser 201 are automatically generated new expressions that have the potential to match the ontology in 300, i.e., which are potentially related to the area of interest. Each new expression is provided with a link providing a direct access to a list of sources in 101, 102, 103 in which this new expression appears.

The method of operating the data collection module 100 and data analysis component 200 may include
- Gather data from external sources 101, 102, 103 in a database in data collection 100 component
- Concatenate data in single textual form
- Split content in expressions, such as bi-grams for example
- Use content filter which may include
  - url
  - email
  - domain names
  - non ascii char and punctuation
  - person names
  - upper case
- Tokenise and Count
- TermsRanker
  - StatisticalRanker
  - ContextRanker
- Write new expressions to data analysis component database The lifecycle analyser component 202 is a further module, preferably a software module, executed by the processing unit. Its purpose is to determine a likelihood of innovation at each time for each expression, based on the trend data stored in database of collection component 100 and possibly on other data. The lifecycle analyser component uses an innovation model in order to determine the innovation likelihood associated with an expression, as a function of time during a period.

Figure 8:
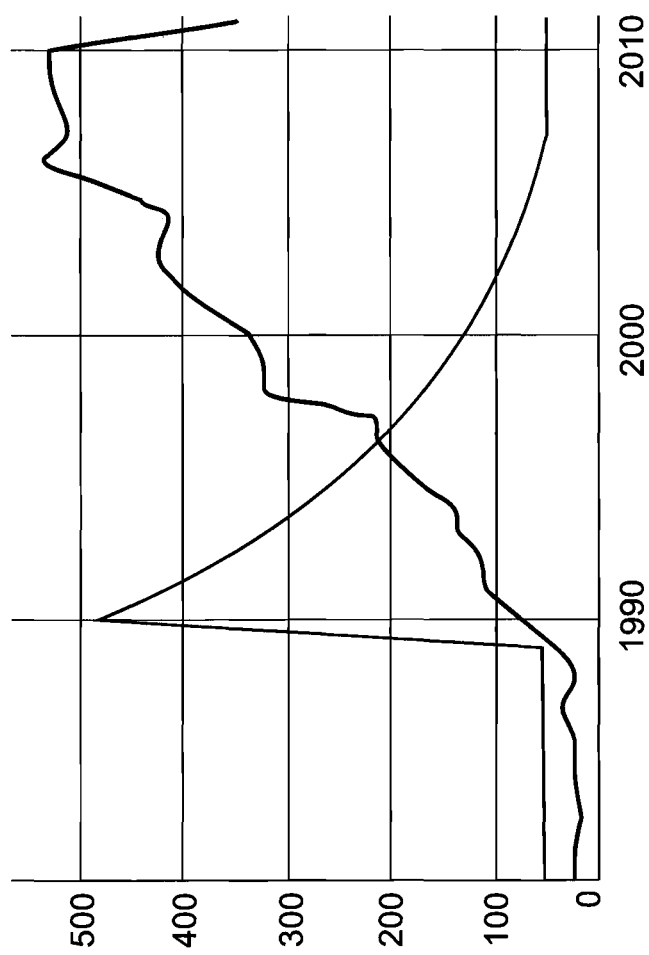
FIG. 8 is an example of screenshot of the lifecycle analyser

An example of data output by the module 202 is illustrated on FIG. 8 which shows the innovation likelihood associated with the term "LED backlit LCD" over time. The assumption behind the innovation model used by the lifecycle analyser 202 is that innovation described with a specific expression is much more likely to happen at specific period of time, for example when the use of this expression starts to increase in data sources, and then progressively decreases as this expression becomes more common. In one aspect, the innovation model is dependent on the technical domain ("area of interest"). For example, use of new expressions tends to widespread faster in information technology than in medical technology. Therefore, a purpose of the lifecycle analyser is to provide, in an automatic way, data useful for identifying which of the expressions in the database of data collection 100 are "new expressions", i.e., expressions whose use in databases started to increase in a significant way during the period of time selected by the user, whereas the significance of the increase depends on the innovation model for the given technology.

The domain modelling component 300 is a module, such as a software module with a database, which stores reference data describing the area of interest. The description of the area of interest may be expressed as a graph or ontology, which can fully represent an area of interest at each level of its structure. An example of ontology is illustrated on FIG. 3. The graph contains elements (terms or expressions related to technologies or substances) and relationships between these elements. The tool may also display a visual representation.

Optionally, relationships can be explicitly defined (e.g. part_of, is_a) to draft a formal ontology to be represented in XML-like standards, such as OWL.

The reference data may be amended and updated over time by the lifecycle analyser 202 and/or by the user via the user toolbox 500.

The matching engine 400 receives data from the domain modelling component 300 and from the data analysis component 200 and carries out matches between new expressions identified by data analysis component 200 and elements in the reference data and identifies innovation opportunities for presenting to the user via the user toolbox 500. The purpose is to determine, from all the new expressions retrieved by the data analysis module 200, those which might be related to the area of interest as defined by the domain ontology in 300.

The matching is carried out either directly by unifying elements and relationships, or by exploiting some external ontological resources such as those referred to in the domain modelling component 300. In the former strategy, elements shall be normalized and matching of new expressions with elements of the ontology might be more or less constrained using string-to-string edit distances or morphological analysis so that morphological variants (e.g. magnet, magnetic, magnetism) can be conflated to the same semantic unit.

One possible method associated with the matching engine 400 may include:
- Load stored reference data from domain modelling component 300 into local store
- Extracting each element
- Select suitable elements
- Load n-grams found in new expressions as determined by data analysis component 200
- Match each element of the ontology 300 against each tokenised n-gram found in the new expressions
- Calculate possible matches
- Create for each good match a new annotation to the associated reference data term The user toolbox 500 presents results to an end user in an interactive way on either fixed or mobile platforms. Presentation of the results may be done visually or via an audio output, for example. This is done in such a way so as to allow the results to be logically interpreted and substantiated. For example, a portion of the reference data may be displayed showing an element against which a new expression has been matched. Users may click on a representation indicating that there has been a match, and see any underlying innovation likelihood measure. Other related information may be provided such as news articles, blogs, etc. Notification of convergence matches can occur in real-time to the end-user through multiple channels, such as text message and e-mail.

Figure 2:
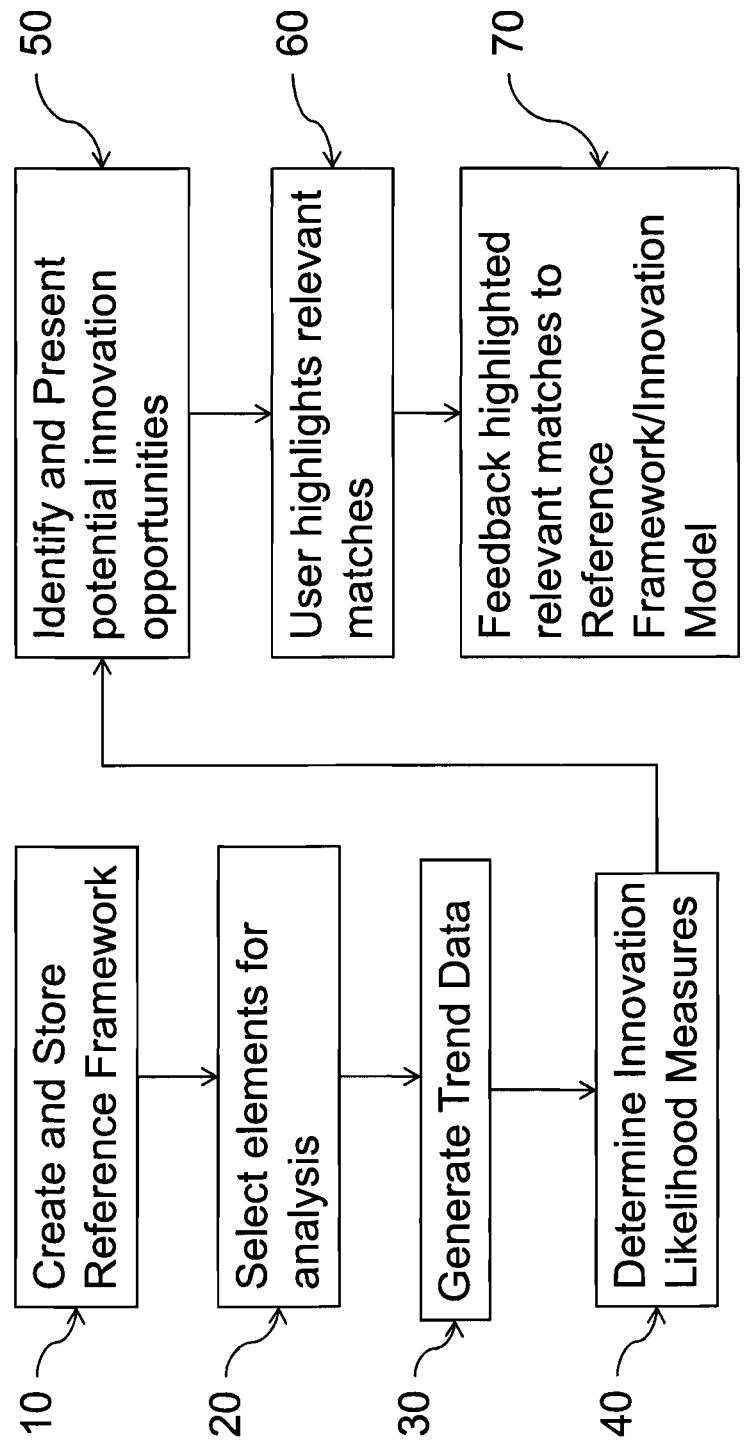
FIG. 2 is a flow chart illustrating the method of the present invention.

Referring now to FIG. 2, in some aspects of the invention reference data stored in module 300 and describing elements (such as terms or expressions) relating to an area of interest is provided by a reference framework (or ontology) which gives a broad semantic definition of the area of interest. At step 10 the reference framework is created and stored for use in the innovation generation method of the present invention.

The stored reference data is represented as an ontology by the reference framework. This is a system of interconnected nodes each node describing an element of the area of interest. An example is illustrated on FIG. 3. FIG. 3 shows a portion of an example reference framework for a portion of a Games Console. In the embodiment described here the area of interest is a particular product. Each of the elements which make up the product is defined by a node usually representing a semantic expression (which may be a single word or a phrase). Any sub-elements which make up an element are defined by related nodes etc. until a complete structure is defined. Conveniently this structure may be a tree or tree like and may be modelled on forms traditional in ontologies, but it will be appreciated that the interconnections between nodes are not limited to such a hierarchical structure. Optionally, further underlying elements or characteristics for each node may be defined as can be seen in the example shown in FIG. 3.

At step 20 expressions are selected for analysis. Expressions may be selected by various criteria. Primarily however this may be by identifying in the data analysis component 200 new expressions (terms or expressions not previously known and not present in the reference framework).

The analysis of each expression is carried out at steps 30 and 40 by the Lifecycle Analyser which takes the selected expression $T_i$ and outputs a time dependant innovation likelihood measure of the expression based on trend data stored in component 100.

The innovation likelihood measure is in the form of a number or a probability which represents a likelihood that the expression $T_i$ might contribute to a novel invention at a given time $t_j$.

At step 30 the Lifecycle Analyser thus retrieves trend data for the expression $T_i$ over time for example, for example based on search volume on an Intranet or the Internet (using a tool such as Google Insight for example), or the number of hits reported by a web crawler (such as a web crawler part of component 100, or any other crawler) or the frequency of the expression in searched documents. At step 40, the trend data thus determined is then used to infer a time-series innovation likelihood of the element. The Innovation Model is then applied to determine an innovation likelihood measure for the expression $T_i$, i.e., the probability of the expression $T_i$ contributing to a novel invention. The Innovation Model defines the relationship between the trend data and inferred likelihood of invention novelty, both of which are usually time variant.

Depending on its source, the trend data may be noisy, and data from different sources may have different amplitudes. The trend data thus acquired is pre-processed to clean the data by smoothing and normalisation algorithms.

For example, such time series data may be processed further to make it easier to identify time-series trends. Functions used may include time domain signal processing functions. Alternatively, or additionally, conversion into the frequency domain may be carried out using a Fourier Transform to provide further differentiation between possible low/high value contributors to inventions and the basis further processing using signal processing functions for further analysis.

Such transformations can allow determination of innovation probabilities that depend upon the rate of change, or cycles, of the trend data. For example, if a Fourier Transform is used different frequency bands will correspond to different 'frequency components' in the time based trend data, which will depend upon the rate of change of the time based trend data.

FIG. 4 illustrates trend data in the form of processed and scaled word frequency data against time for the semantic expressions "time of flight" and "led backlight".

Figure 5:
FIG. 5 shows an example innovation model.

The trend data is input to an Innovation Model such as the one illustrated in FIG. 5 to produce an innovation likelihood which varies over time (i.e. the output is related to the probability of the element contributing towards a novel innovation opportunity). The Innovation Model represents a transfer function which maps trend data to a likelihood that a novel innovation will result. In a further example illustrated in 4a, the result of applying an Innovation Model to the trend data illustrated in FIG. 4 can be seen. As can be seen a policy of the Innovation Model has been defined such that when the trend data for the expression "LED backlight" in FIG. 4 exceeds a defined threshold for the first time then it is inferred that inventions related to this expression will have the highest likelihood of novelty. This decreases over time, which is reflected by the function which is then applied. The gradient and indeed the timing of the original threshold point may be linked to the contextual match against the stored reference data. For example, fast changing industries are likely to have a higher gradient than those which change more slowly. Because of this the characteristics of the Innovation Model are indicative of the speed at which information flows in the area of interest and the efficiency with which this information is applied by those who work in that area.

The Innovation Model may be simple—for example, it may apply a logarithmic scaling factor to the trend data, starting from when the trend first exceeds a certain threshold (the start of the lifecycle or 'S' curve). Alternatively integral/differential or other functions may be used according to the relationship between innovation value and the trend data.

Innovation models can be manually derived, or automatically calculated by making reference to the frequency and evolution of innovations within a specific domain. For example a rate of innovation may be determined by determining the time between an expression first appearing in a data search and a priority date for a patent covering an associated innovation.

The innovation likelihood value data is used to derive an innovation likelihood measure for each selected expression $T_i$ at a given time.

At step 50 potential innovation opportunities are identified and presented to the user by the user toolbox 500 on the basis of the innovation likelihood measures determined by the Lifecycle Analyser at step 40. The list of innovation opportunities might be a ranked list, based on various possible ranking criteria, including for example the innovation likelihood.

Some aspects of the invention include a feedback step. At step 60 a user may indicate which matches are relevant, and at step 70 this information is used to update the reference data (the ontology) so as to adapt the system over time. This may be done by updating the ontology/reference framework. The parameters of the innovation model may also be updated.

In one aspect of the invention new expressions identified by the semantic new term scanner 204 may be matched to the reference framework 300 and only those new expressions having a match in the reference framework may be processed. It is also possible to process only new terms found in documents classified in relevant classifications.

Figure 6:
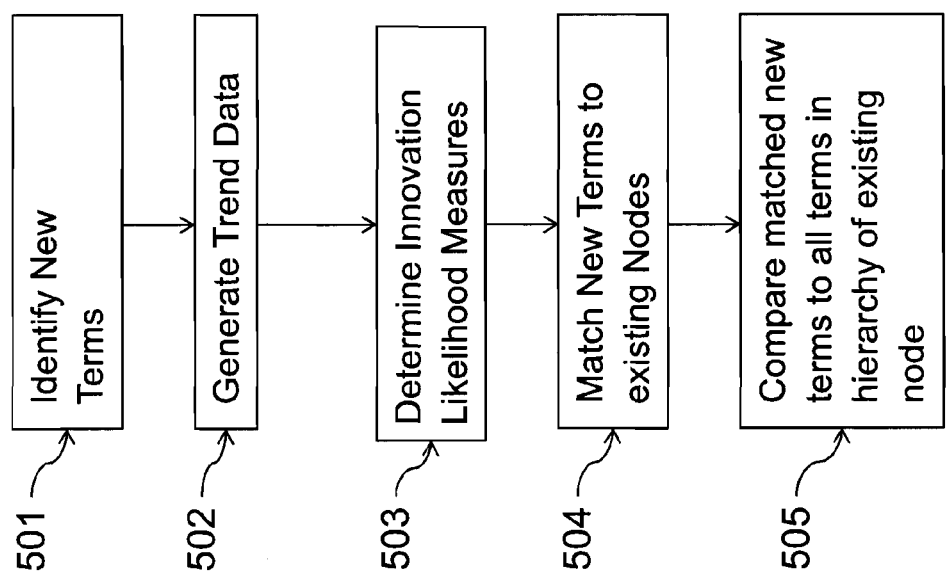
FIG. 6 is a flow chart showing a portion of the method in more detail in one particular embodiment of the invention.

With reference to FIG. 6, at step 501 the semantic new term scanner 204 is used to identify new expressions from data passed from the data collection component 100.

The new term scanner 204 attempts to generate new synonyms (acronyms), as well as hypernyms (superordinate word or phrase) and hyponyms (subordinate word or phrase) of expressions collected from external sources 101-103.

At steps 502 and 503, innovation likelihood measures are generated for new semantic expressions by the Lifecycle analyser 202 and these are stored together with the new semantic expressions.

At step 504 the new expressions and their innovation likelihood measures are compared with the semantic elements represented by nodes of the reference framework 300 together with the innovation likelihood measures of those elements, in the matching engine 400 to determine a match. Such matching might, in some aspects, only be done for nodes which have already been identified as being of particular interest according to the own innovation likelihood measure. For example, this matching might be done for nodes which have themselves a high innovation likelihood.

Each new expression may match against more than one element of the reference data, or it may be the case that the new term scanner 204 produces the same new semantic expression for more than one existing expression. This event is recognized by the matching engine as a multiple match event. When a multiple match event occurs, the new expression is identified as being matched against a plurality of elements in the reference framework 300.

At step 505 further analysis may be carried out to compare the innovation likelihood measures of matched new expressions with those of elements both above and below the matched elements in the reference framework hierarchy so as to be able to understand how an innovation may flow across the components which make up the area of interest, and how it will relate directly to the area of interest itself.

Such further analysis may also identify potential innovation opportunities.

In a second embodiment of the invention, at step 20 the new term scanner 204 is used to identify new expressions $T_i$ which may be of interest in the area. The new term scanner 204 does not search for new expressions which are related to those in the reference frame work, rather the new term scanner searches for new expressions 'per se' i.e. new or recently introduced expressions such as new words or bi-grams not present, or not as frequent before in sources 101-103. Trend data for those new expressions $T_i$ is collected from a data source and the trend data is pre-processed and normalised as described above.

In this aspect of the invention selected expressions may relate to an unknown area of interest and therefore a default Innovation Model may be used to determine innovation likelihood measures at step 40.

Figure 7:
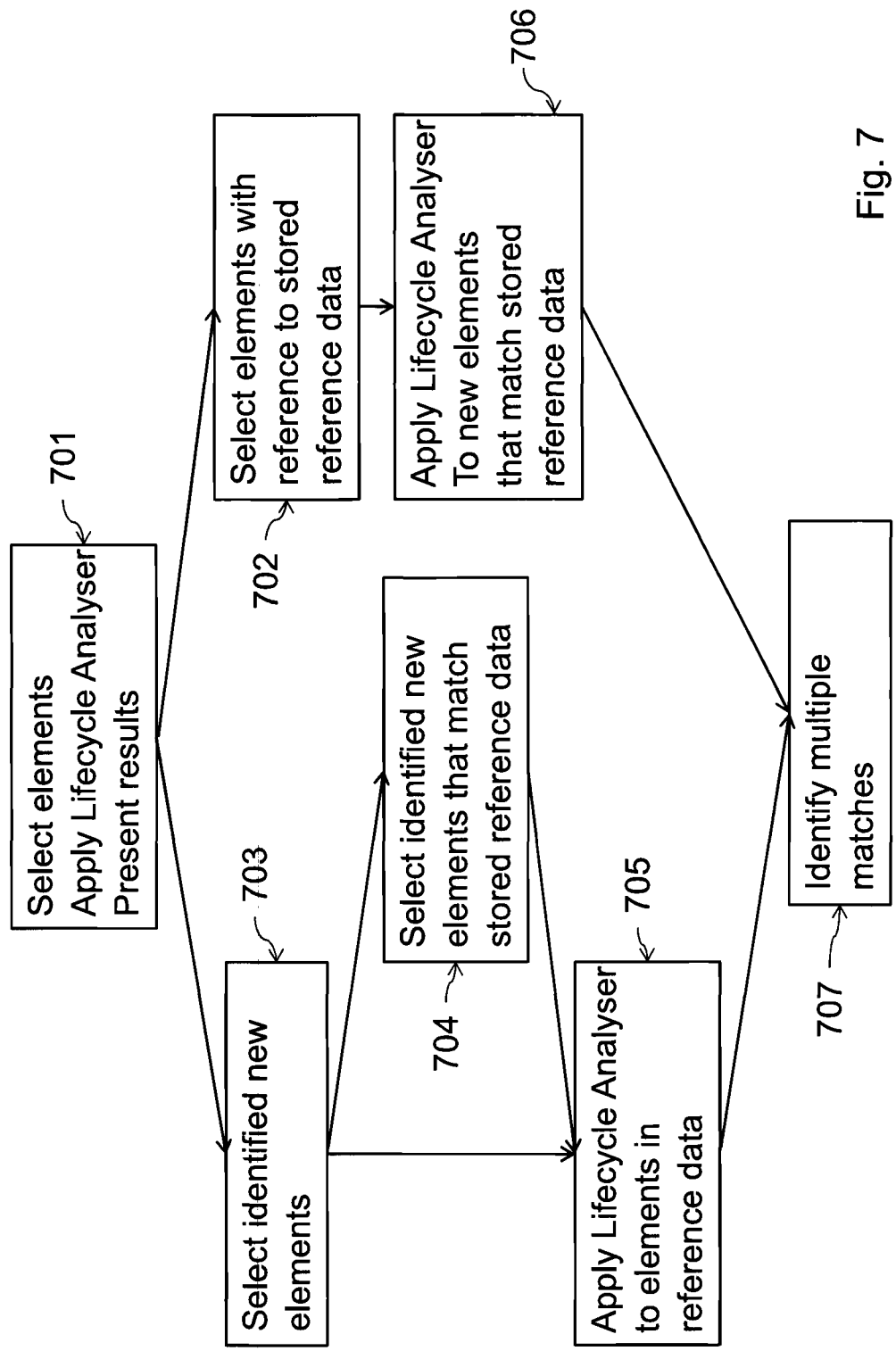
FIG. 7 is an illustration of showing various aspects of the present invention

FIG. 7 is an illustration of various embodiments of the present invention, which illustrate how the Lifecycle Analyser may either be applied to new expressions first or to expressions of the stored reference data first. In one aspect of the invention 701, expressions are selected, the lifecycle analyser is applied and the results are presented to the user (corresponding to steps 20, 30, 40, 50 on FIG. 2).

In the first embodiment of the invention 703 new expressions are identified at step 703 and the lifecycle analyser 202 is applied to those. In one variation 704 the lifecycle analyser is only applied to new expressions that match the reference framework 300. In a preferred variation of that embodiment 705 the lifecycle analyser is then applied to expressions selected from the stored reference data.

In the second embodiment of the invention 702, expressions are selected from the stored reference data as described previously. In a preferred variation of that embodiment 706 the lifecycle analyser is then applied to new expressions that match the stored reference data.

In either aspects, once the lifecycle analyser has been applied to both expressions selected from stored reference data 300 and to new expressions determined by parser 201 and/or semantic new term scanner 204, an embodiment 707 includes the step of identifying multiple matches.

Figure 4A:
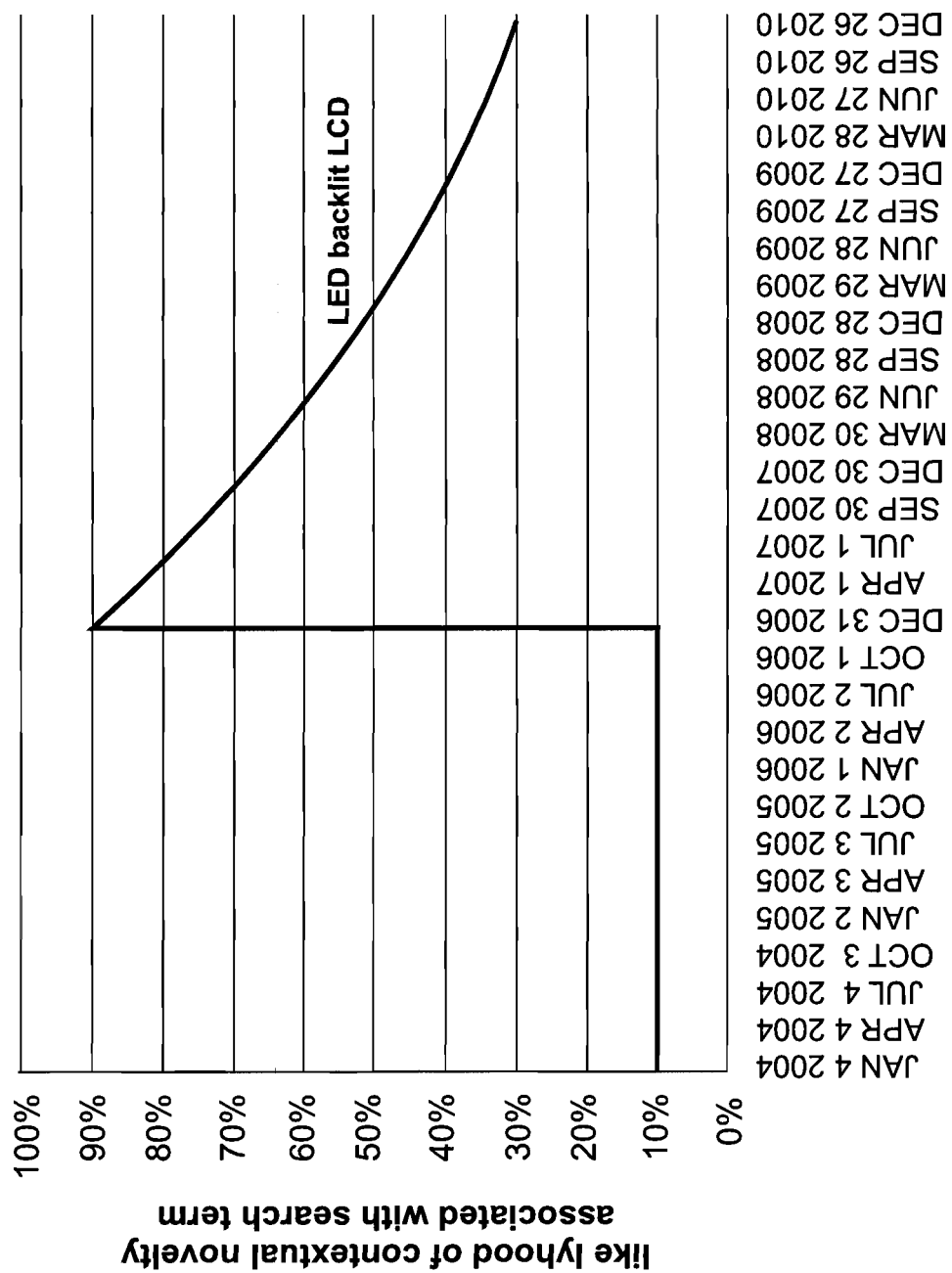
FIG. 4a shows a graph of innovation likelihood over time for a term, in this example "LED backlit LCD", in the context of a specific area of interest.

An embodiment of the invention may be exemplified as follows. With reference to FIG. 3, the expression "LED" is selected from the stored reference data. A new expression, "LED backlit LCD" which is semantically related to the stored element "LED" is then identified. Trend data which may, for example, be based on word frequency publications for this new expression is determined as shown in FIG. 4. An innovation likelihood measure is then determined, as shown in FIG. 4a for the expression "LED backlit LCD". Optionally, this trend data may be determined contextually by considering those elements of the stored reference data of which "LED" forms a part. An innovation likelihood measure is also determined for the expression "LED" and to exclude the use of LED in different contexts. Innovation likelihood measures for both the terms of "LED" and "LED backlit LCD" are then used to determine the likelihood of an innovation opportunity at the time when the new element is identified. Accordingly in this example, there is a match between the LED used in a Time-of-Flight gesture recognition system and a LED backlit LCD. This indicates the possible basis of an invention. The likely novelty of this is then determined by the innovation likelihood measure of both expressions.

Another embodiment of the invention may be exemplified as follows. This example relate to new use of LEDs for producing light used in a time-of-flight based 3D light sensor. With reference to FIG. 3, the expression "LED" is selected from the stored reference data. A new expression, "LED backlit LCD" is then identified by the semantic new term scanner 204. Trend data which may, for example, be based on word frequency in selected publications for this expression is determined as shown in FIG. 4. An innovation likelihood measure is then determined, as shown in FIG. 4a by applying an innovation model which defines a relationship between the time variant trend data and the innovation likelihood measure. The innovation likelihood measure is then used to determine the likelihood of an innovation opportunity at a particular point in time for the trend data. In this example, there is a match between the "LED" used in a Time-of-Flight gesture recognition system and a "LED backlit LCD". This indicates the possible basis of an invention. The likely novelty of this is then determined by the innovation likelihood measure, and the likely novelty of the match subsequently substantiated.

Trend data which may, for example, be based on expression frequency in selected publications is calculated for a plurality of new expressions. One of these is the term "LED backlit LCD". An innovation likelihood measure is then determined, as shown in FIG. 4a, which determines that this expression may result in a novel invention. The expression "LED backlit LCD" is then matched against the stored reference data, which may be an ontology, in this case producing a semantic match against the expression LED to produce the innovation opportunity.

The components described herein may be implemented in a variety of ways. Referring to FIG. 1, various modules 100, 200, 300, 400 and/or 500 are represented as a series of interrelated functional blocks that may represent functions implemented by, for example, one or more integrated circuits (e.g., an ASIC) or may be implemented in some other manner as taught herein.

A database, such as for example the database which might be included in the data collection 100, the domain modelling 300, etc. might be implemented as a relational database using a SGBD, as collection of documents such as for example XML documents, as a collection of text files, as a semantic database or filestore, as a cloud store, or with any other suitable data storing means.

The apparatus might comprise one single, integrated apparatus, such as a computer or server or set of servers, or a plurality of interconnected equipment, including equipment interconnected over an Internet, over the Internet, or in a cloud.

Each module 100, 200, 300, 400 and/or 500 may include one or more modules that may perform one or more of the functions or steps described above with regard to various figures. For example, the data analysis module 200 may comprise a plurality of sub-modules 201, 202, 203, 204. In addition, each module 100, 200, 300, 400 and/or 500 represented by FIG. 1 as well as other components and functions described herein, may be implemented using any suitable means, including as a software module carried out by suitable processing means, such as a processing unit, for carrying out the required functionality and steps. Each step described and claimed in the present application may be carried out by a suitable software module executed by suitable processing unit for carrying out the required functionality.

The methods described and claimed may be carried, at least in part, using software modules carried out by a suitable processing unit or other processing means. Those of skill would further appreciate that any of the various illustrative logical blocks, modules, processors, means, circuits, and algorithm steps described in connection with the aspects disclosed herein may be implemented as electronic hardware, various forms of program or design code incorporating instructions (which may be referred to herein, for convenience, as "software" or "module" or "software module"), or combinations of both. To clearly illustrate this interchangeability of hardware and software, various illustrative components, blocks, modules, circuits, and steps have been described above generally in terms of their functionality.

A software module (e.g., including executable instructions and related data) and other data or database may reside in a data memory such as RAM memory, flash memory, ROM memory, EPROM memory, EEPROM memory, registers, a hard disk, a removable disk, a CD-ROM, or any other form of computer-readable storage medium known in the art.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner.

It is understood that any specific order or hierarchy of steps in any disclosed process is an example. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented. Moreover, in some aspects any suitable computer-program product may comprise a computer-readable medium comprising codes (e.g., executable by at least one computer) relating to one or more of the aspects of the disclosure. A computer program product may comprise packaging materials.

The invention claimed is:

1. A computer-enabled method of determining innovation opportunities comprising the steps of:

a) causing a data collection module in a processing unit to store expressions retrieved from external data sources in a data collection;

b) causing a data analysis module in a processing unit to identify from among said expressions retrieved from external data sources, based on trend data which comprises a representation of the use of said expressions in said external data sources during a predefined time period, all expressions which appear for the first time during that predefined time period, or all those expressions whose appearances follows a pattern during that predefined time period;

c) selecting an area of interest;

d) creating an ontology which comprises expressions which related to the area of interest e) selecting from the stored expressions one or more expressions which are related to the area of interest and which are not contained in said ontology;

f) obtaining trend data for each said selected one or more expressions, wherein the trend data comprises a representation of the use of said selected expressions in said external data sources during a predefined time period;

g) causing a lifecycle analyser in said processing unit to apply a transfer function to said obtained trend data, which maps said obtained trend data to an innovation likelihood measure, to determine an innovation likelihood measure for each of said selected one or more expressions, wherein said transfer function is indicative of the speed at which information flows in said selected area of interest, and wherein the application of said transfer function results in associating to each of said selected expression the highest innovation likelihood at an instant when said trend data for an expression exceeds a defined threshold for the first time, and associating to said expression a decreasing probability after said instant; and h) identifying one or more potential innovation opportunities based on the innovation likelihood measure;

i) presenting said one or more innovation opportunities for inthrmation and analysis by a user.

2. A method according to claim 1, further comprising:
matching the identified expressions with the selected area of interest;
presenting said innovation opportunity only for expressions which match said selected area of interest.

3. A method according to claim 2, comprising the steps of:
modelling said area of interest with said ontology;
semantically matching the identified expressions with elements of said ontology,
presenting said innovation opportunity only for expressions which semantically match said elements of said ontology.

4. A method according to claim 1, in which the step of selecting one or more expressions comprises providing a link to one or more documents or pages used in the determination of said expressions.

5. A method according to claim 4, wherein a patent classification is used to automatically exclude expressions which are found in documents not related to an area of interest.

6. A method according to claim 1,
wherein an expression is identified as an identified expression depending on said innovation likelihood measure for said expression.

7. A method according to claim 1, wherein said innovation likelihood computed by said lifecycle analyser is a function of time.

8. A method according to claim 7, wherein said transfer function is domain specific.

9. A method according to claim 3, further comprising a step of causing a lifecycle analyser in said processing unit to apply a transfer function to trend data associated with elements of said ontology, and determine an innovation likelihood measure for said elements,
   wherein said innovation opportunity is determined based on said innovation likelihood measure for said element.

10. A method according to claim 3, further comprising the step of:
   updating the ontology in dependence upon feedback from a user relating to said innovation opportunity.

11. A method according to claim 1, further comprising the step of:
   causing a module in the processing unit to rank a plurality of innovation opportunities based on an innovation likelihood at a given instant.

12. A method according to claim 1, wherein said trend data comprises a number of searches for said expression with a search engine over a time period.

13. A method according to claim 1, further comprising presenting to the user the innovation opportunities as a portion of semantic reference data along with an identified expression.

14. A method according to claim 1, further comprising presenting to the user each innovation opportunity along with a link to source documents where identified expressions related to this innovation opportunity have been found.

15. A method according to claim 1 further comprising,
   receiving a user-selection of one or more the potential innovation opportunities which are presented in step (i); and
   adjusting the ontology based on the received selection.

16. A method according to claim 1 further comprising,
   receiving a user-selection of one or more the potential innovation opportunities which are presented in step (i); and
   adjusting the transfer function based on the received selection.

\* \* \* \* \*